US007261848B2

(12) United States Patent
Yekutiely

(10) Patent No.: US 7,261,848 B2
(45) Date of Patent: Aug. 28, 2007

(54) METHOD OF MAKING A CANDLE ASSEMBLY

(76) Inventor: Reshef Yekutiely, Mitzpe, Hila, 24953 (IL)

( * ) Notice: Subject to any disclaimer, the term of this patent is extended or adjusted under 35 U.S.C. 154(b) by 268 days.

(21) Appl. No.: 10/834,339

(22) Filed: Apr. 29, 2004

(65) Prior Publication Data

US 2004/0201123 A1 Oct. 14, 2004

Related U.S. Application Data

(63) Continuation-in-part of application No. 10/176,676, filed on Jun. 24, 2002, now abandoned.

(51) Int. Cl.
*B27N 5/00* (2006.01)
*B29C 43/02* (2006.01)

(52) U.S. Cl. ....................... 264/112; 264/115; 264/138; 264/330

(58) Field of Classification Search ................ 264/109, 264/112, 115, 123, 138, 330
See application file for complete search history.

(56) References Cited

U.S. PATENT DOCUMENTS

| | | | | | |
|---|---|---|---|---|---|
| 3,002,221 | A | * | 10/1961 | Wright | 264/112 |
| 3,689,616 | A | * | 9/1972 | Kelley | 264/115 X |
| 3,702,495 | A | * | 11/1972 | Renoe | 264/109 X |
| 4,291,458 | A | * | 9/1981 | Flinn | 29/650 |
| 6,056,541 | A | * | 5/2000 | Gerszewski | 431/288 |

* cited by examiner

*Primary Examiner*—Leo B. Tentoni
(74) *Attorney, Agent, or Firm*—Dekel Patent Ltd.; David Klein

(57) ABSTRACT

A candle assembly including a receptacle candle comprising a wick-clip-less wick. A method for manufacturing a candle assembly is also provided, comprising feeding a portion of a wick (e.g., a roll of wick) into a candle mold, and cold compressing a candle material (non-atomized wax droplets, solidified from raw wax material) into the mold about the portion of the wick to form a receptacle candle.

4 Claims, 1 Drawing Sheet

METHOD OF MAKING A CANDLE ASSEMBLY

CROSS-REFERENCE TO PREVIOUS APPLICATIONS

This application is a continuation-in-part application of and claims priority from U.S. patent application Ser. No. 10/176,676, filed Jun. 24, 2002, now abandoned.

FIELD OF THE INVENTION

The present invention relates generally to candles that comprise a candle fuel held in a receptacle, which fuel liquefies into a liquid held in the receptacle during burning of the candle, and particularly to such a candle with a wick that does not have a wick clip.

BACKGROUND OF THE INVENTION

Candles have been known and used since early civilization. A typical candle is formed of a solid or semi-solid body of a candle fuel, typically a wax such as paraffin wax or beeswax, and it contains an axially embedded combustible fibrous wick. When the wick of such a candle is lit, the generated heat melts the solid wax, and the resulting liquid flows up the wick by capillary action and is combusted.

One general family of candles includes candles that comprise a candle fuel held in a container, vessel or receptacle (the terms being used interchangeably throughout), which fuel liquefies into a liquid held in the receptacle during burning of the candle. Such candles are referred to throughout the specification and claims as "receptacle candles". Examples of receptacle candles include tea lights, comprising relatively shallow metal containers, and are used extensively in restaurants, wedding halls and the like. Other kinds of receptacle candles include lights used for decorative and religious purposes.

One type of a receptacle candle comprises an initially solid or semi-solid candle fuel held in the receptacle, such as a candle manufactured with wax powder compression technology. Paraffin or other hydrocarbon raw materials are used to manufacture such candles. Such candles may liquefy in layers, that is, an upper layer may melt first, while the lower layers remain solid or semi-solid, generally due to the candle fuel being a poor conductor of heat. Only after the candle has burned for a while, does the entire candle fuel liquefy.

Another type of a receptacle candle is a gel candle. Gel candles are typically made according to a two stage process: a batch stage in which a gel-forming liquid composition is prepared in a batch (i.e., a container or vessel), followed by a continuous filling stage in which candle containers are filled with the gel-forming liquid composition from the batch. As used herein, "gel-forming liquid composition" generally refers to any colloidal dispersion that transforms into a gel state upon cooling, and "gel state" or "gel" generally refers to a colloidal dispersion that has attained a structure that prevents the dispersion from flowing.

Receptacle candles of the prior art require a structure to hold the wick upright throughout the burning of the candle. The structure used in the prior art is called a "wick clip", generally comprising a metal disc attached to the bottom end of the wick. For example, in a typical candle manufactured with wax powder compression technology, the candle is molded in a first manufacturing machine with a central, vertical axial hole. The wick clip is made and the wick is attached thereto in a second manufacturing machine. Finally, the wick and wick clip are assembled through the hole of the candle either by hand labor or by a third manufacturing machine. The wick clip rests on the bottom surface of the receptacle and supports the wick during burning of the candle.

However, the wick clip has disadvantages. Residual candle fuel may be left in the receptacle because the presence of the wick clip may prevent complete combustion of the fuel. The wick clip must be removed from the receptacle after the candle has completely burned. This is an annoying and time-consuming task. If the wick clip is not removed and another receptacle candle is placed in the receptacle, the candle will not burn with the wick straight, leading to charring of the receptacle and possible heat damage and even breakage of the receptacle.

Candles are known that are manufactured by compressing wax at cold (room) temperature. U.S. Pat. No. 3,002,221 to Wright describes manufacturing candles from a finely particulate form. Molten wax is atomized in a gaseous atmosphere into fine, powder-like, tiny solid particles, which are compressed to form a candle. U.S. Pat. No. 3,689,616 to Kelley describes manufacturing candles from wax flakes or shavings produced by cutting teeth which shave off wax particles from solid wax disposed on a drum.

SUMMARY OF THE INVENTION

The present invention seeks to provide a novel candle assembly and a method for manufacturing such a candle assembly, as is described more in detail hereinbelow.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
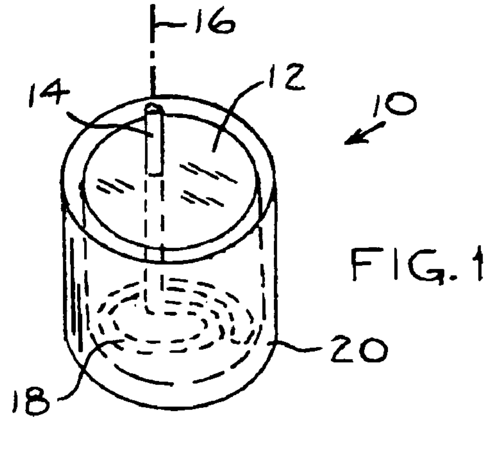
FIG. 1 is a simplified pictorial illustration of a candle assembly, constructed and operative in accordance with an embodiment of the present invention.

Reference is now made to FIG. 1, which illustrates a candle assembly 10, constructed and operative in accordance with an embodiment of the present invention.

Figure 4:
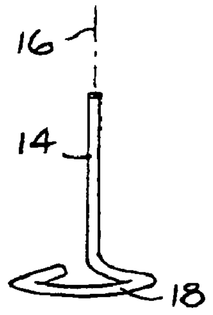
FIG. 4 is a simplified pictorial illustration of a wick of the candle assembly of FIG. 1, constructed and operative in accordance with an embodiment of the present invention.

Candle assembly 10 comprises a receptacle candle 12 with a wick 14 that, unlike the prior art, has no wick clip. Wick 14 may have a longitudinal axis 16 and may be formed with a base 18 angled with respect to axis 16. Base 18 may be formed by a loop of any shape or size extending from axis 16. For example, in the embodiment illustrated in FIG. 1, the loop may be at least partially arcuate. Alternatively, as seen in FIG. 4, the loop may have a generally polygonal shape, such as triagonal. It is appreciated that these are just two examples of shapes of base 18, and the invention is not limited to these examples.

Receptacle candle 12 may be made of any suitable candle fuel, such as but not limited to, a candle manufactured with compression technology. Wick 14 may any kind of suitable wick, such as but not limited to, a fiber wick coated with a wax, e.g., paraffin, and may be embedded in receptacle candle 12. For example, one suitable manner of manufacturing candle assembly 10 may comprise cold compression of a non-powder candle material in a candle mold (not shown) with wick 14 centrally held in the mold. A controlled amount of paraffin solid particles (e.g., flakes, chunks and the like) may be introduced into the mold and cold compressed by an impact hammer (not shown) to form receptacle candle 12 with wick 14 embedded therein. The receptacle candle 12 may be removed from the mold and the wick 14 may be trimmed to a desired length of protrusion.

Unlike the prior art mentioned in the background, the paraffin solid particles comprise raw material of the size and shape as supplied from refineries. This raw material, unlike the prior art, consists of droplets of molten wax that have dropped and solidified on a conveyor belt (or equivalent conveyance device). These solidified, non-atomized wax droplets are significantly less expensive than the non-raw material used for cold compression in the prior art. The size and shape of the solidified wax droplets may in the range of 1-12 mm, but the invention is not limited to this range at all.

Figure 5:
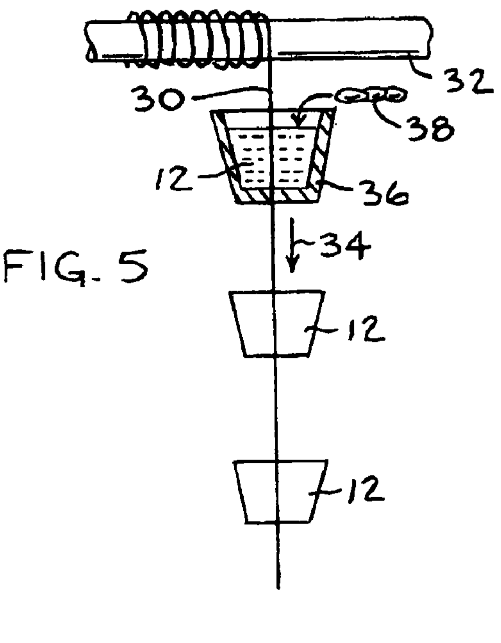
FIG. 5 is a simplified pictorial illustration of one example of manufacturing the candle assembly of FIG. 1, in accordance with an embodiment of the present invention.

Another example of manufacturing candle assembly 10 is described now with reference to FIG. 5. A roll of wick 30 may be spooled off a reel 32. The wick 30 may pass through a central portion of a candle mold 36. Candle material 38 (e.g., solidified wax droplets or any other candle material) may be fed into candle mold 36 and cold compressed therein to form receptacle candle 12 with wick 30 embedded therein. Mold 36 may then be opened to release the receptacle candle 12, and the wick 30 may be advanced in the direction of an arrow 34. Once again candle material 38 may be fed into candle mold 36 surrounding a fresh portion of wick 30 to form another receptacle candle 12. Any amount of receptacle candles 12 may thus be continuously manufactured along the length of wick 30. At any convenient station of the process, the wicks may be trimmed to have a length that protrudes beyond a first surface (e.g., the top surface) of the compressed paraffin, and a length that protrudes beyond a second surface (e.g., the bottom surface) of the candle material 38. The bottom portion of the wick may be formed into base 18 and embedded in the bottom of the candle material 38, thus completing formation of the receptacle candle 12 and wick 14, as shown, for example, in FIG. 1.

The receptacle candle 12 and its wick 14 may be placed in any kind of receptacle 20, which may be opaque, transparent or translucent, or any combination thereof. For example, candle assembly 10 may be a tea light, in which case receptacle 20 may comprise a relatively shallow metal, opaque container. As another example, candle assembly 10 may comprise a decorative or religious candle assembly with a tall or relatively small glass container. It is appreciated that these are just two examples of candle assemblies 10, and the invention is not limited to these examples.

Figure 2:
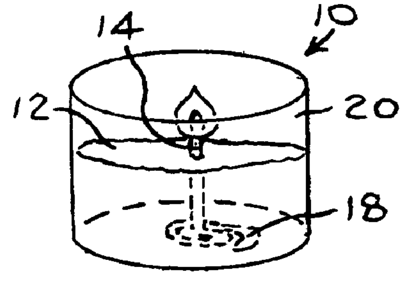
FIG. 2 is a simplified pictorial illustration of the candle assembly of FIG. 1 during combustion thereof.
Figure 3:
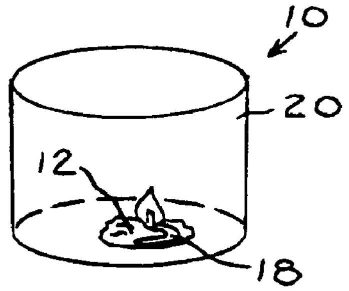
FIG. 3 is a simplified pictorial illustration of the candle assembly of FIG. 1 towards the end of combustion thereof.

FIG. 1 illustrates candle assembly 10 prior to combustion thereof. In FIG. 2, wick 14 has been lit and the candle fuel of receptacle candle 12 has at least partially liquefied. Wick 14 may be self-supporting throughout burning of the candle. As seen in FIG. 3, wick 14 may burn completely to its end and there is generally no residual wick or candle fuel that remains in the receptacle 20.

It is noted that in the prior art, when the candle fuel pool becomes very shallow, the fuel may become hot enough to vaporize and flare up (i.e., ignite) without a wick, this phenomenon being known as "flash" or "flashover". This may be due to the relatively small amount of wick left in the relatively large amount of candle fuel when the candle fuel pool becomes very shallow. That is, the wick-to-fuel ratio is very small when the fuel pool is shallow. In contrast, in the present invention, when the candle fuel pool becomes very shallow, there is still a relatively large amount of wick left because the wick does not end in a point but rather in the relatively wide base 18. The wick-to-fuel ratio remains high. Thus, the candle of the present invention may burn to the end with no residual matter and no flashover.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A method for manufacturing a candle assembly comprising:

cold compressing non-atomized wax droplets, solidified from raw wax material, into a mold about a portion of a wick to form a receptacle candle;

forming a plurality of said receptacle candles spaced from one another along a roll of said wick;

trimming said portion of said wick to have a length that protrudes beyond a first surface of said candle material, and another length that protrudes beyond a second surface of said candle material; and forming one of the lengths of said wick that protrudes beyond one of the surfaces of said candle material into a base angled with respect to a longitudinal axis of said portion of said wick, and embedding said base into said candle material.

2. A method for manufacturing a candle assembly comprising:

feeding a portion of a roll of wick into a candle mold;

cold compressing a candle material into said mold about said portion of said wick to form a receptacle candle;

trimming said portion of said wick to have a length that protrudes beyond a first surface of said candle material, and another length that protrudes beyond a second surface of said candle material; and forming one of the lengths of said wick that protrudes beyond one of the surfaces of said candle material into a base angled with respect to a longitudinal axis of said portion of said wick, and embedding said base into said candle material.

3. The method according to claim 2, further comprising forming a plurality of said receptacle candles spaced from one another along said roll of wick.

4. The method according to claim 2, wherein said base is bent generally perpendicular to the longitudinal axis of the wick and is located only at a bottom portion of said candle material.

* * * * *